Nov. 15, 1960 A. HAMILTON 2,960,632

ELECTRICAL SPARK-OVER PROTECTIVE DEVICES

Filed Aug. 27, 1956

INVENTOR
Andrew Hamilton
By Morris & Bateman
ATTORNEYS 2,960,632
Patented Nov. 15, 1960

2,960,632

ELECTRICAL SPARK-OVER PROTECTIVE DEVICES

Andrew Hamilton, Timperley, England, assignor to Metropolitan-Vickers Electrical Company Limited, London, England, a British company Filed Aug. 27, 1956, Ser. No. 606,242

Claims priority, application Great Britain Sept. 1, 1955

2 Claims. (Cl. 317—69)

This invention relates to electrical spark-over protective devices and has an important application inter alia in protective devices for multiple circuit low voltage systems, such as telephone systems.

In many systems such as telephone systems, it is necessary to provide independent protection for a large number of separate circuits without occupying an excessive space.

The main object of the invention is to provide an improved protective device suitable for such systems.

The present invention comprises a block of silicon carbide material having at least three metallised surface areas separated by accurately dimensioned spark-over gaps in the metal coating, at least two of said areas being adapted for electrical connection to separate electrical circuits and being adjacent to at least one area connected to a point of reference potential such as earth so that an excessive potential in either circuit causes a spark over across the gap concerned.

Conveniently the silicon carbide material is shaped and then sintered, to produce a hard ceramic-like block, and thereafter the surfaces of the block may be sprayed with a metallising coating to provide electrical connections.

Preferably the block is in the form of a prism having the side faces metallised but not the end faces whilst the longitudinal edges between the side faces are machined away to provide spark gaps between the edges of the remaining metal coating, at least two of the metallised faces of the prism being electrically connected to respective circuits and the remaining face or faces to a point of reference potential so as to form protective spark-over gaps between the metallised faces. The prism may have three surfaces or more than three surfaces.

Conveniently the prism has an even number of faces, alternate faces being connected to respective circuits to be protected and the intervening faces being earthed.

According to one specific embodiment the prism is square or rectangular in section and one pair of opposite faces is connected to earth or other reference point whilst one of the intervening faces is connected to one circuit and the remaining face to a second circuit so that protective spark-over gaps are provided between the last two mentioned faces and the earthed faces.

The prisms may, prior to machining, be of simple polygonal section, or ridges or ribs may be formed which, when machined away, provide the necessary gaps in the metallic coating.

In order that the invention may be more clearly understood reference will now be made to the accompanying drawings, in which:

Fig. 1*a* is an end view of a square prism which may be used in carrying out the invention;

Fig. 1*b* is a perspective view of the same prism;

Figure 1:
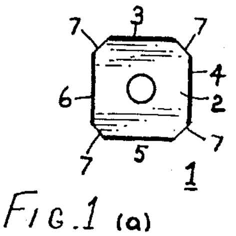
Figure 1:
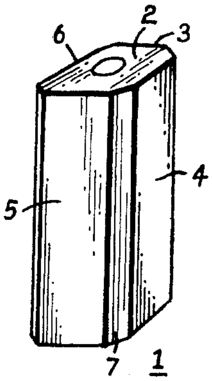
Figure 2:
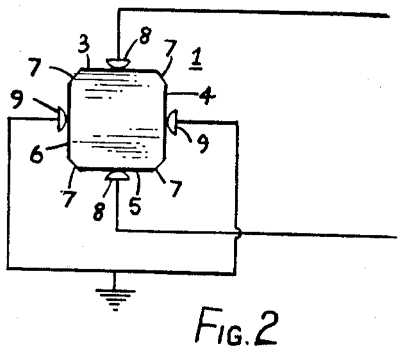
Fig. 2 is a circuit arrangement showing how a prism of the type shown in Fig. 1 may be used for protecting a pair of electrical circuits.

Figs. 1 and 2 show a block 1 having end faces 2 and sides 3, 4, 5 and 6; initially the block is a complete rectangle, the sides 3, 4, 5 and 6 being metallised but not the end faces 2 and then the longitudinal edges are machined away to provide the spark over gaps 7 between the metallised faces.

Fig. 2 shows how such a block would be connected electrically; in the arrangement shown the surface 3 is connected to circuit No. 1 and the surface 5 to circuit No. 2 whilst surfaces 4 and 6 are earthed. Thus each circuit is protected by two spark over gaps in parallel. Electrical connection with the surfaces 3 and 5 of the prism is made by contacts 8 and with the earthed surfaces 4 and 6 by contacts 9 all of which contacts may conveniently be spring contacts.

Figure 3:
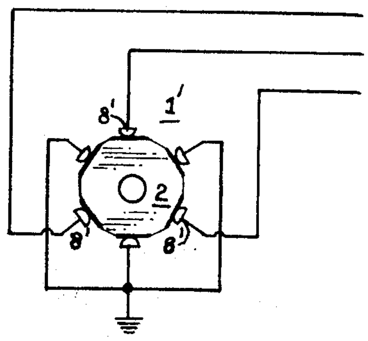
Fig. 3 is a similar circuit arrangement showing how a hexagonal circuit may be used for protecting three different circuits.

Fig. 3 shows a circuit arrangement which is similar to Fig. 2 but in this case a hexagonal prism is employed and protection is afforded to three circuits. In this case alternate faces are earthed and the intervening faces connected to respective circuits to be protected.

It should be noted that with the above arrangements the high resistance of the silicon carbide material under normal conditions ensures that the leakage currents across the gaps, i.e. leakage to earth and leakage between circuits, are small. These small leakage currents perform a useful function when connected to telephone or telegraph lines by draining the lines of static charges which are caused by the near presence of thunderstorms or for other reasons. Further, it should be noted that the presence of silicon-carbide material between the circuits and earth provides protection against small overvoltages which are insufficient in magnitude to break down the spark gaps. In each of the arrangements shown it will be seen that there are two spark gaps in parallel between the circuit to be protected and earth. In view of the fact that repeated sparking causes gradual erosion of the metal along the edges of the spark gaps, the presence of the two spark gaps is advantageous in prolonging the life of a unit.

Figure 4:
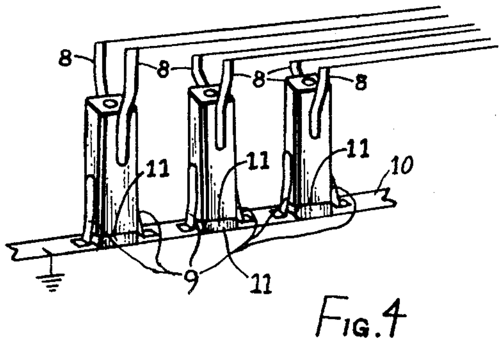
Fig. 4 is a diagrammatic perspective view showing how a number of prisms of the type shown in Figs. 1 and 2 may be arranged to protect a multiplicity of lines.

If a large number of circuits is to be protected in one locality, banks of spark gap devices may be built up and Fig. 4 shows diagrammatically part of one such bank. Each resistor is mounted between spring contacts 9 attached to an earthing strip 10, the conducting surfaces of the resistor units being separated from the earthing strip by insulators 11 or by leaving bands of the units adjacent to the lower ends unmetallised. Conveniently the earthing strip may be provided with insulating spigots spaced at intervals to co-operate with the axial holes in the resistor units, thereby locating them in position between the spring contacts. Alternatively, the units may be secured to the earthing strip by means of insulated screws passing through the holes in the units. Connections to the circuits to be protected are made through spring contacts 8. One particullar application of this type of arrangement is in telephone exchanges, for the protection of subscribers' lines against overvoltages.

What I claim is:

1. An electrical sparkover protective apparatus comprising a prismatic block of silicon carbide material having two end faces, and an even number of side faces separated by parallel edges extending between said two end faces, and a metallic coating to each alternate side face uniformly extending over the full length of each of said alternate side faces, which coatings form in combination with the intervening unmetallised faces a plurality of sparkover gaps, each of said gaps being of uniform width and of length substantially equal to the length of the edges of the side faces and uniformly extending over the full length of said block, a plurality of individual contact members each contacting respectively with one of said metallic coatings, a separate connection between each alternate contact member and an independent electrical circuit to be protected, and connections between the intervening contact members and ground, whereby two protective sparkover gaps are provided between each electrical circuit and ground and have an aggregated length substantially equal to twice the length of each of said alternate side faces.

2. An electrical sparkover protective apparatus comprising a prismatic block of silicon carbide material having two end faces and eight side faces separated by parallel edges extending between said end faces, and a metallic coating to each alternate side face uniformly extending over the full length of each of said alternate side faces, which coatings form, in combination with the intervening unmetallised faces four sparkover gaps, each of said gaps being of uniform width and of length substantially equal to the length of the edges of the side faces and uniformly extending over the full length of said block, four spring contact members each of which is adapted to make contact respectively with one of said metallised coatings, separate connections between two alternate contact members and independent electrical circuits which are to be protected, and connections between the two intervening contact members and ground, whereby two protective sparkover gaps are provided between each electrical circuit and ground and have an aggregate length substantially equal to twice the length of each of said alternate side faces.

References Cited in the file of this patent

UNITED STATES PATENTS

| | | |
|---|---|---|
| 919,569 | Gifford | Apr. 27, 1909 |
| 1,022,717 | Wurts | Apr. 9, 1912 |
| 1,545,646 | Everett | July 14, 1925 |
| 1,901,893 | Brodie | Mar. 21, 1933 |

FOREIGN PATENTS

| | | |
|---|---|---|
| 214,946 | Great Britain | Aug. 14, 1924 |
| 616,683 | Great Britain | Jan. 25, 1949 |